United States Patent
Carnegie

(10) Patent No.: US 10,859,288 B1
(45) Date of Patent: Dec. 8, 2020

(54) WINDOW UNIT AIR CONDITIONER INSTALLER AND SUPPORT ROD

(71) Applicant: Lavern V. Carnegie, Washington, DC (US)

(72) Inventor: Lavern V. Carnegie, Washington, DC (US)

(*) Notice: Subject to any disclaimer, the term of this patent is extended or adjusted under 35 U.S.C. 154(b) by 0 days.

(21) Appl. No.: 15/954,714

(22) Filed: Apr. 17, 2018

Related U.S. Application Data

(60) Provisional application No. 62/486,291, filed on Apr. 17, 2017.

(51) Int. Cl.
| | |
|---|---|
| *F24F 13/32* | (2006.01) |
| *E06B 7/28* | (2006.01) |
| *F16M 13/02* | (2006.01) |
| *F24F 1/027* | (2019.01) |

(52) U.S. Cl.
CPC .............. *F24F 13/32* (2013.01); *E06B 7/28* (2013.01); *F16M 13/02* (2013.01); *F24F 1/027* (2013.01); *F24F 2221/20* (2013.01)

(58) Field of Classification Search
CPC ........ F24F 13/32; F24F 1/027; F24F 2221/20; F16M 13/02; E06B 7/28
USPC ................. 248/208, 241, 670; 62/262, 259.1
See application file for complete search history.

(56) References Cited

U.S. PATENT DOCUMENTS

| | | | |
|---|---|---|---|
| 1,446,231 A | 2/1923 | West | |
| 1,954,419 A | 4/1934 | Lynch et al. | |
| 2,433,104 A | 12/1947 | Eberhart | |
| 2,828,052 A | 2/1953 | Cira | |
| 2,717,508 A | 9/1955 | Loveley et al. | |
| 2,818,793 A | 1/1958 | Hord | |
| 2,842,199 A * | 7/1958 | Pfeiffer | F24F 1/027 160/369 |
| 2,889,764 A * | 6/1959 | McGrath | F24F 1/04 454/204 |
| 2,925,026 A | 2/1960 | Schuster et al. | |
| 2,973,973 A | 4/1961 | Sweedyk et al. | |

(Continued)

OTHER PUBLICATIONS

EZ-AC Air Conditioning Support Bracket; 8191377; HSN; www.hsn.com/products/ez-ac-air-conditioning-support-bracket/8191377; 2017, printed Mar. 21, 2017; 16 pgs.

*Primary Examiner* — Muhammad Ijaz
(74) *Attorney, Agent, or Firm* — Blank Rome LLP

(57) ABSTRACT

An adjustable assembly for installing and supporting a window unit air conditioner (WUAC) allowing a one-step easy installation and removal. The apparatus has two U-shaped horizontal member and one U-shaped vertical member that utilize the window frame and the weight of the WUAC, to install and keep the WUAC in place. The assembly fits behind and unto the spine of the WUAC as well as across the width of the WUAC. When lifted in place, the assembly fits against the window frame using gravity to securely keep the WUAC in place. The assembly may be used alone or in combination with the horizontal support member and/or the vertical member depending on the weight of the WUAC. The second U-shaped member is placed around both sides and the rear of the installed WUAC with the flange supported against the inner window frame. Using tension force, this provides support for the extruding WUAC. The vertical U-shaped member extends from the sides of the horizontal member and traverses the bottom of the WUAC to give support.

19 Claims, 18 Drawing Sheets

(56) References Cited

U.S. PATENT DOCUMENTS

| | | | |
|---|---|---|---|
| 3,094,916 A | | 6/1963 | McGrath et al. |
| 3,134,319 A | | 5/1964 | Marsteller |
| 3,476,033 A | | 11/1969 | Appel |
| 3,554,476 A | | 1/1971 | Gaylor, Jr. |
| 3,911,803 A | | 10/1975 | Kong et al. |
| 4,371,026 A | * | 2/1983 | Miller .................... A47H 19/00 160/349.2 |
| 5,112,015 A | | 5/1992 | Williams |
| 5,125,197 A | * | 6/1992 | Fuchs ..................... F24F 13/20 312/100 |
| 5,967,478 A | * | 10/1999 | Tynes .................... A47B 45/00 248/208 |
| 6,173,930 B1 | | 1/2001 | Arbucci |
| 6,371,422 B1 | | 4/2002 | St. Martin et al. |
| 6,640,509 B2 | | 11/2003 | Clewis |
| 6,767,278 B1 | | 7/2004 | Peterson |
| 2007/0023592 A1 | | 2/2007 | Makoso |
| 2009/0071180 A1 | | 3/2009 | Jones |
| 2013/0153744 A1 | * | 6/2013 | Jin .......................... F24F 13/32 248/670 |
| 2015/0034784 A1 | * | 2/2015 | Darby .................... F24F 13/32 248/236 |
| 2015/0097096 A1 | * | 4/2015 | Arbucci ................... E06B 7/28 248/208 |
| 2016/0363341 A1 | * | 12/2016 | Arens ..................... F24F 7/065 |
| 2017/0297768 A1 | * | 10/2017 | Gamboa ............... B65D 85/68 |

\* cited by examiner

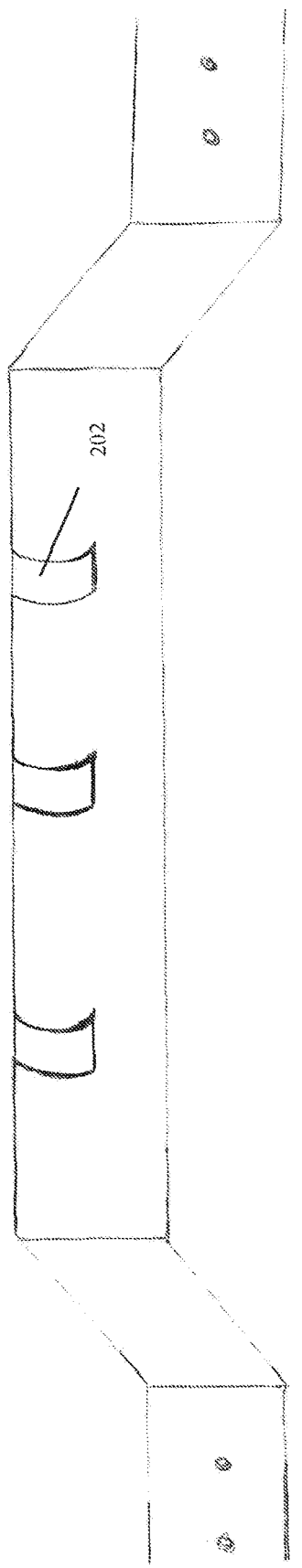
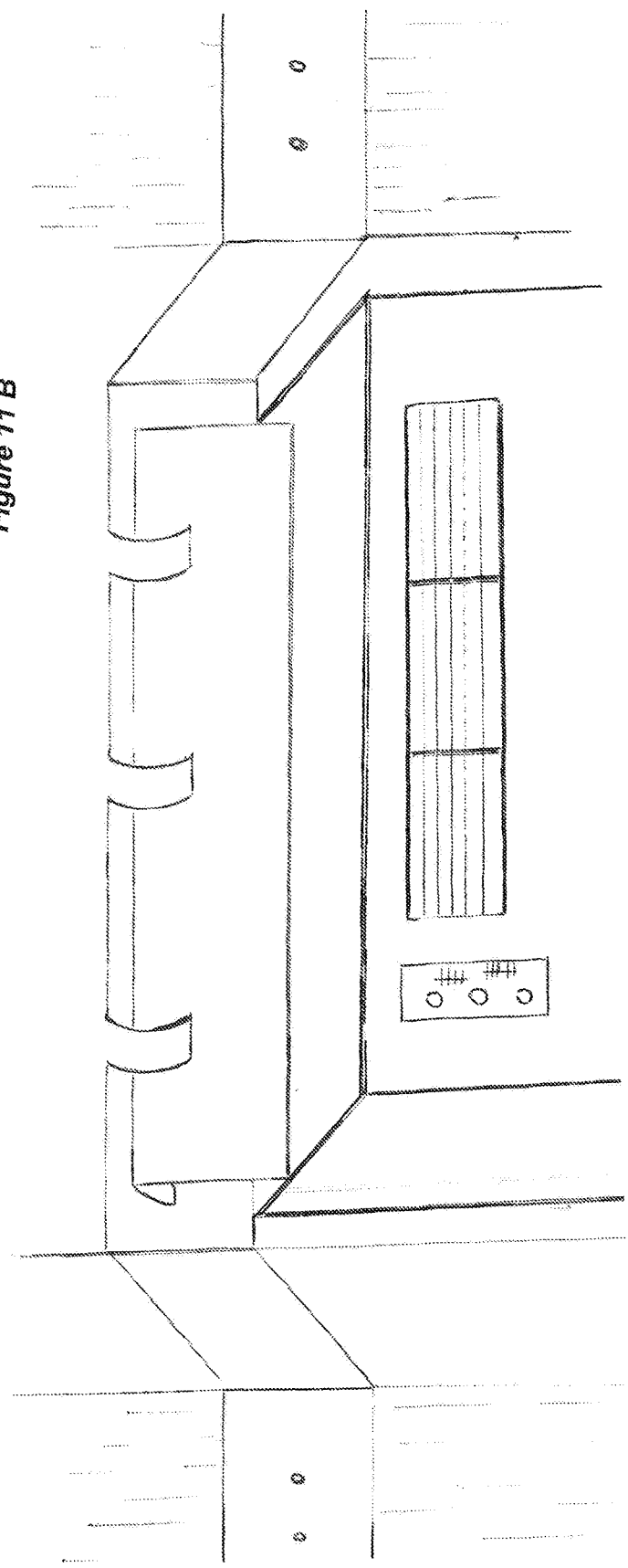
Figure 11 A
Figure 11 B

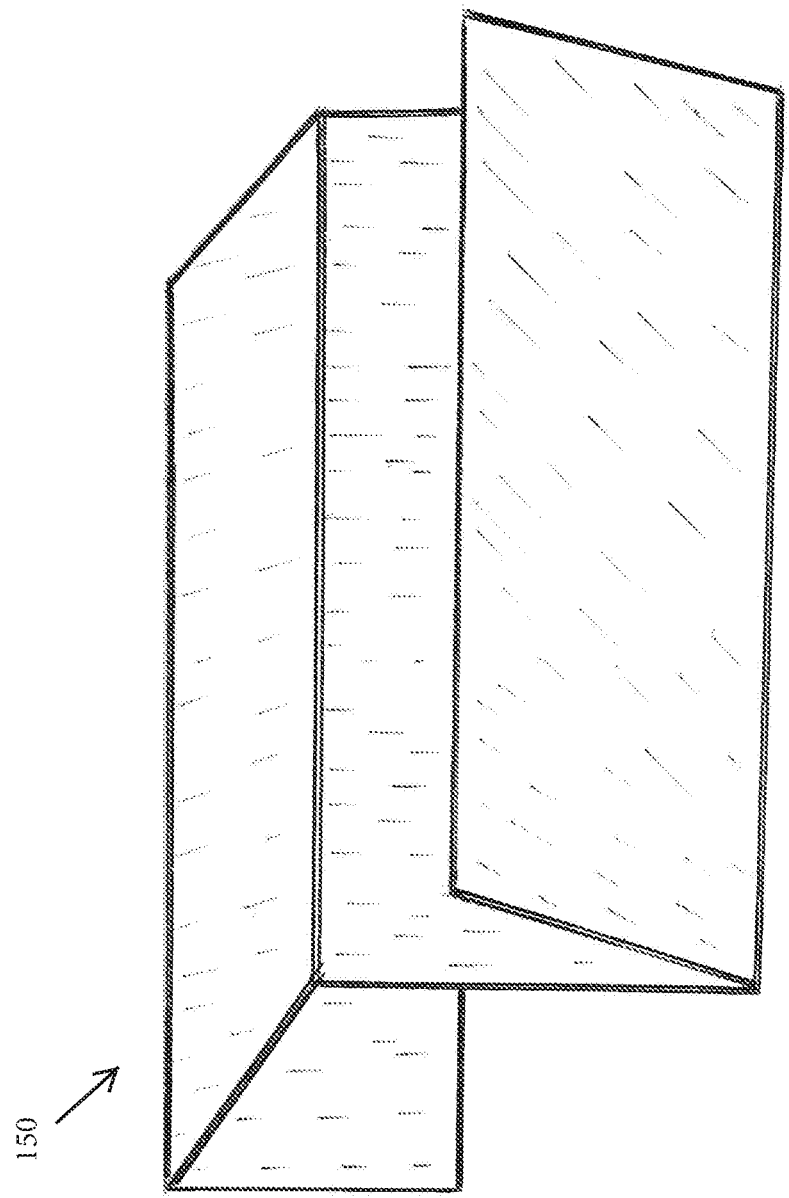

WINDOW UNIT AIR CONDITIONER INSTALLER AND SUPPORT ROD

RELATED APPLICATIONS

This application claims the benefit of U.S. Provisional Application No. 62/486,291, filed Apr. 17, 2017, the entire contents of which are incorporated herein by reference.

BACKGROUND OF THE INVENTION

Field of the Invention

The invention relates to the installation of a Window Unit Air Conditioner (WUAC) and the physical support of such a unit, with and without the use of tools, while allowing for a safe, sturdy and secure fit.

Background of the Related Art

A standard Window Unit Air Conditioner (WUAC) or AC unit 10 is shown in FIG. 5. It generally has a housing or body 20 that is shaped as an elongated cube with a front side 21, rear side 22, top side 24, bottom side 26, right side 27, and left side 28. The WUAC are discrete devices that have their own housing, and generally have a cuboid or rectangular prism shape with a rectangular cross section, and all of the sides are generally rectangular in shape.

The air conditioner unit 10 is specifically designed to fit in a window opening 2 of a home or building, and especially for windows that slide up and down to open and close. One such double hung window is shown in FIG. 1. Accordingly, a rail or spine 30 (FIG. 5) is provided that extends along the entire width of the unit along the top side 24. The spine 30 is usually a metal piece that extends orthogonally upward from the top side 24 and engages the front bottom inside edge of the lower window sash when the window is closed down against the top side 24 of the WUAC 10. The spine 30 prevents the WUAC 10 from falling out of the window because the spine rests against the bottom of the window. A similar support ember or projection is sometimes also provided on the bottom side 26 of the WUAC 10 and engages a lip on the bottom window frame on which the WUAC 10 rests. The spine 30 defines a front portion 32 and a rear portion 34 of the WUAC 10. When positioned in a window, the front portion 32 of the WUAC 10 is at the interior of the home or building, and the rear portion 34 of the WUAC 10 is at the exterior of the home or building.

However, window unit air conditioners are heavy and can be cumbersome and difficult to grip, often requiring more than one individual to complete the installation process, and requiring dexterity and some amount of technical skills. Installation can also be dangerous should a unit fall from a window during the process. The unit has to be lifted, safely placed within the window, properly and securely placed on the window stool or properly aligned in the bottom rail slot of the window then secured in place with the window sash. Larger units may have to be completely removed from their housing, the housing installed and the unit then reinserted into the housing. Many WUAC have weights in excess of 50 pounds and their size often exceeds the dimensions of the window sill. This size/length, extends beyond the sill, often causing a downward external tilt of the WUAC, and the sill may not be enough to support the AC unit.

Conventional installation requires the downward force of a window sash to hold the WUAC in place but not necessarily upright. The size, make or material of the window sill, may, not support the gravitational weight of the WUAC. Thus, additional support is needed to evenly distribute the weight of the unit to prevent the WUAC from falling off the window sill, prevent damage to the window sash, and prevent the WUAC from shifting out of place on the sloped window sill.

WUACs are installed per manufacturers' instructions and require tools, drilling and an external force in the form of a window casing. The support of the exterior protruding portion of the unit is provided by external mounts, physically secured to an exterior wall beneath the protruding unit. This requires skill, dexterity, technical mastery and often a ladder.

SUMMARY OF THE INVENTION

One purpose of this invention is to provide a simple one-step method, utilizing tension force, to easily and securely install a WUAC without the mandatory use of tools. A second purpose is to provide support for a WUAC from inside a building, in a one-step process that utilizes tension force and does not require the mandatory use of tools. The invention further allows easy grip of a WUAC, and allows ease of removal of the unit.

BRIEF DESCRIPTION OF THE FIGURES

FIG. 4 is a rear view of the installation rod positioned in the window opening from the outside looking in;

FIG. 7 is a rear perspective view of the WUAC of FIG. 6 from the outside looking in;

FIG. 11A is a front view of installation rod with slots for fastening to the spine of a WUAC;

FIG. 11B is a front view of the installation/rod secured to the spine of a WUAC with slots;

DETAILED DESCRIPTION OF THE PREFERRED EMBODIMENTS

Figure 1:
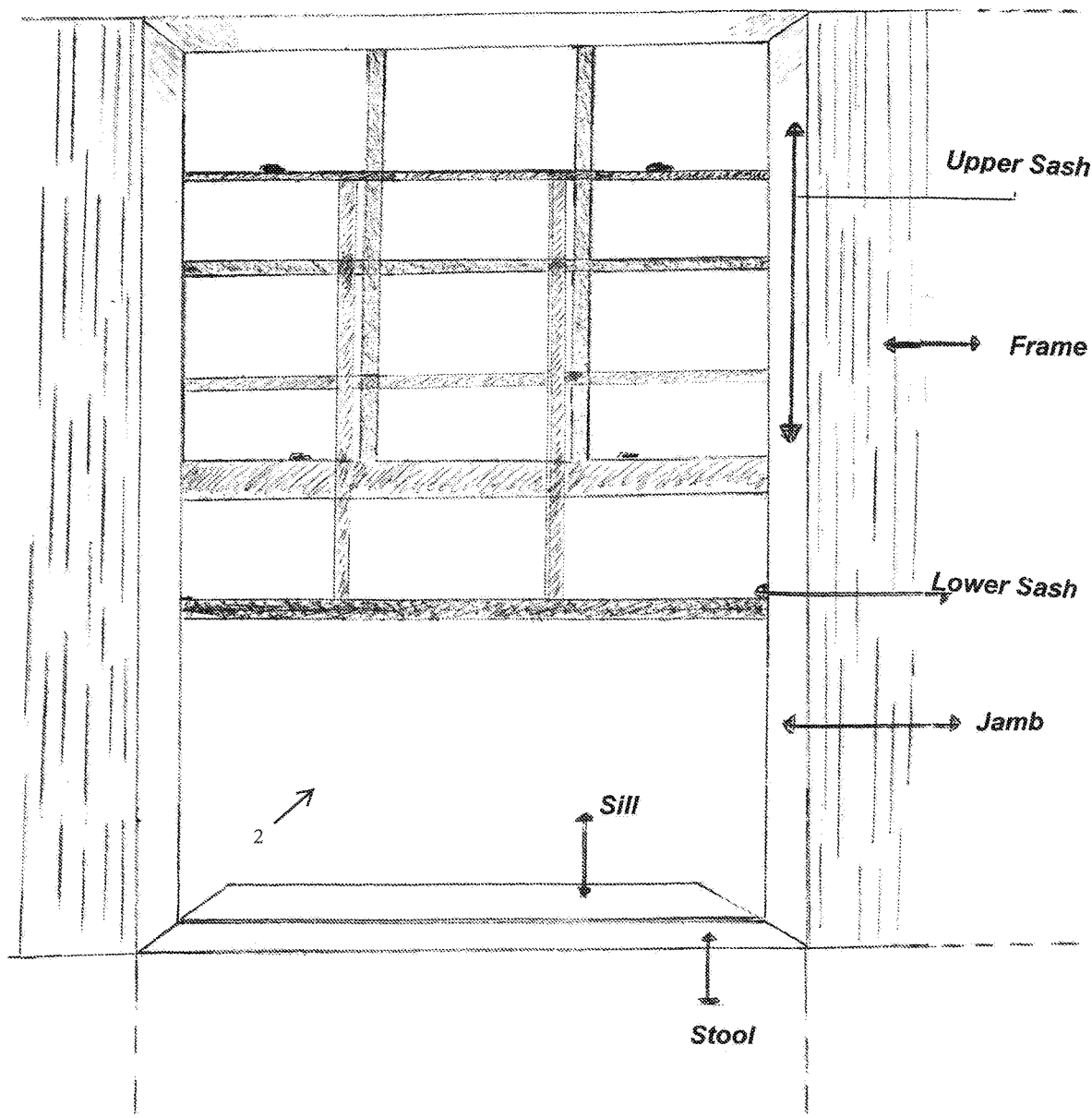
FIG. 1 is a front view of a standard double hung window in the open position.
Figure 2:
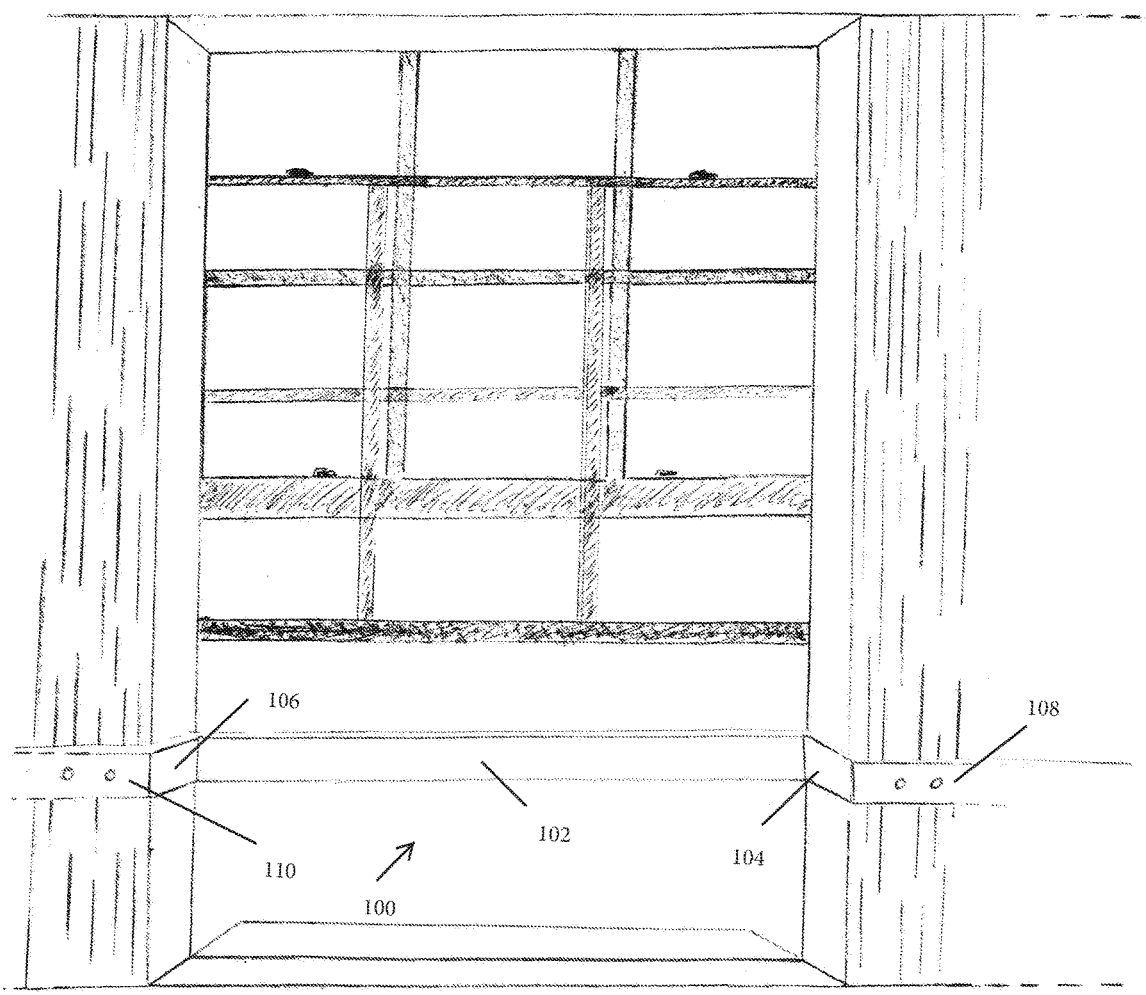
FIGS. 2-3 are front views of the installation rod of the present invention situated in a window opening, with the window in the open position.
Figure 3:
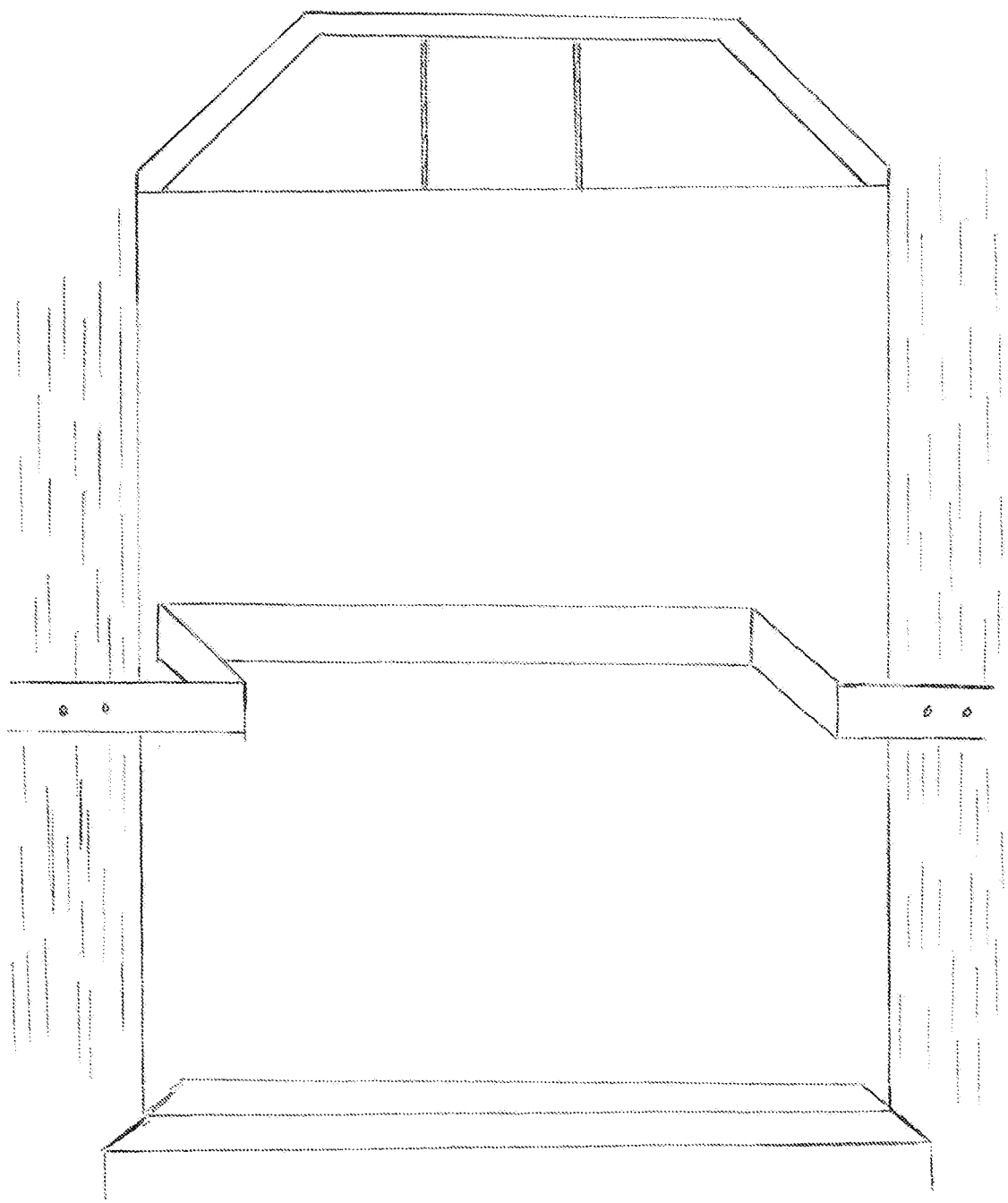
Figure 4:
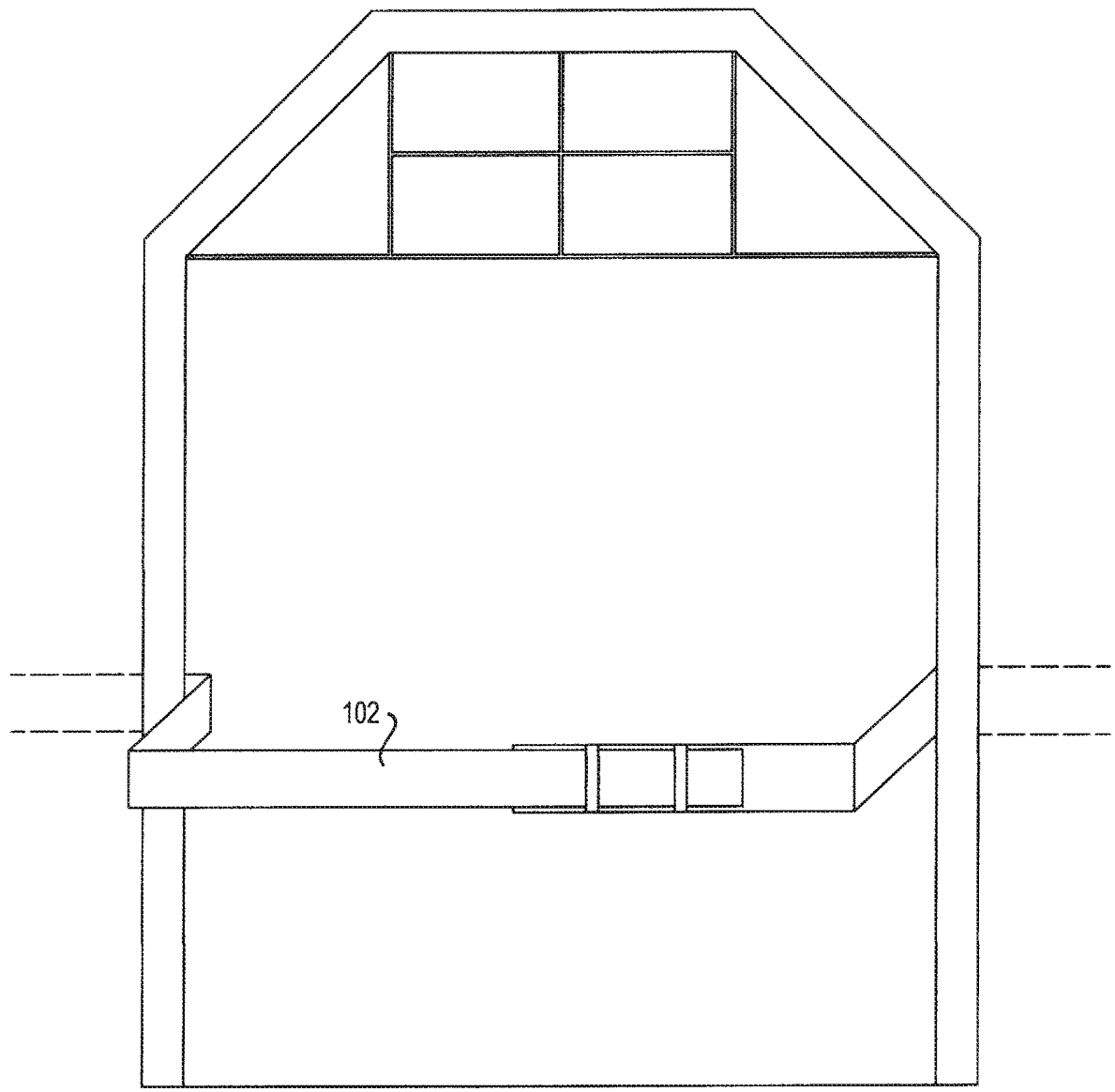

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIGS. 2-4, 8-10, 14-16 show the installation or support apparatus 100 in accordance with a non-limiting example embodiment of the invention. The installation apparatus 100 comprises a generally U-shaped member that is adjustable on all three sides to accommodate varying window widths and jambs. More specifically, the installation apparatus 100 includes a U-shaped portion having a rear support member 102 and two side support members 104, 106 (e.g., first and second side bracket members 104, 106) that extend substantially orthogonal to the rear support member 102 (e.g., rear support bracket member 102). In addition, a flange or connect member 108, 110 (e.g., first and second window frame bracket members 108, 110) is coupled with each side member 104, 106. The connect members 108, 110, side supports 104, 106, and rear member 102 can all be flat elongated bracket members that are generally rectangular in shape.

Thus, the rear support member 102 has a first end that connects with the first side member 104, and a second end opposite the first end, that connects with the second side member 106. The first and second side members 104, 106 each have a respective first and second flanges 108, 110 that extends substantially orthogonal to the side member 104 and outward away from the rear support member 102. Thus, the flanges 108, 110 are substantially parallel with the rear support member 102. The members 102, 104, 106, 108, 110 can be formed as a single integral piece. Or the rear member 102 and side members 104, 106 can be more than one piece that are slidably coupled to each other to be adjustable in the width and depth direction with respect to the WUAC, jamb and window frame. The members 102-110 are thin, weight bearing, elongated metal strips.

Thus, the support apparatus 100 is configured to extend from the front of the left and right window frame at the inside of the building, back through the window opening 2 to the exterior of the building. More particularly, the first connect member 108 is positioned at the front of the right window frame and the second connect member 110 is positioned at the front of the left window frame. Through-holes or openings are provided in the first and second connect members that each receive a fastener (such as a screw) so that the apparatus 100 can be removably fastened to the window frame.

The first connect member 108 is coupled with the first side support member 104 and the second connect member 110 is coupled with the second side support member 106. The first and second side support members 104, 106 extend back through the window jamb to the exterior of the building. The first and second side support members 104, 106 are coupled with opposite ends of the rear support member 102, which extend at the outside of the building.

The apparatus 100 can be configured as a single piece unitary member. In addition, referring to FIGS. 4, 7-10, 14, the apparatus 100 can be configured to be adjustable in width and/or depth. To provide an adjustable width, the rear support member 102 can be formed of two separate discrete pieces to provide a first rear support portion 102a and a second rear support portion 102b. In addition, FIG. 10, one or more fastening devices 103 can be provided on the first rear support portion 102a and/or the second rear support portion 102b. In the example shown, one or more sleeves 103 can be provided on the first rear support 102a in the form of an elongated tab piece that extend transversely across the width of the first rear support 102a. The second rear support portion 102b can have a width that is smaller than the width of the first rear support portion 102a. Or the second support portion 102b can have a distal end portion that is tapered or otherwise narrowed. Thus, the narrower second support portion 102b can be slidably received in the sleeve 103 of the first support portion 102a. Thus, the width is adjusted by moving the portions 102a, 102b in/out with respect to each other, in the direction X. The first and second support portions 102a, 102b can further be locked in that position, such as by a clamp, fastener or the like.

Of course, any suitable fastening device 103 can be provided that permit the first support portion 102a to be slidably or adjustably engaged with the second support portion 102b. For example, through-holes can be provided in the distal ends of each of the first and second support members 102a, 102b, that receive a nut and bolt at various adjustable positions. Still further, the distal end portion of the first support portion 102a can be provided with an elongated slot and the distal end portion of the second support portion 102b can be provided with a hole, and the hole and slot can align to receive a bolt and wing nut at adjustable positions. In one embodiment, the width of the apparatus 100 is adjusted so that the side members 104, 106 extend close to the inner sash of the window frame.

The depth of the apparatus 100 can also be made adjustable in a similar manner. For example, the side support members 104, 106 can be formed as two separate discrete pieces or members that are slidably coupled with one another by a fastening device 105, 107. Mechanical fasteners can be sliding tracks, rivets, embedded screws, hooks or slip-in locks and can allow the apparatus 100 to be adjustable.

Where the apparatus 100 is configured to be adjustable in width only, the apparatus 100 would have two separate pieces or members that slidably and adjustably connect by the fastening device 103. A first member would include the first connect member 108, first side support member 104, and first rear support portion 102a. The second member would include the second connect member 110, second side support member 106, and the second rear support member 102b.

Where the apparatus 100 is configured to be adjustable in depth only, the apparatus 100 would have three separate pieces or members that slidably and adjustably connect by the fastening devices 105, 107. The first member would include the first connect member 108 and a first portion of the first side support member 104, The second member would include the second connect member 110, and a first portion of the second side support member 106. And the third member would include a second portion of the first side support member 104, the rear support member 102, and a second portion of the second side support member 106.

And where the apparatus 100 is configured to be adjustable in width and depth, the apparatus would have four members. The first member would include the first connect member 108 and first portion of the first side support 104, the second member would include the second connect member 110 and the first portion of the second side support 106. The third member would include the second portion of the first side member 104, and the first portion of the rear member 102a. The fourth member would include the second portion of the second side member 106 and the second portion of the rear member 102b.

Figure 8:
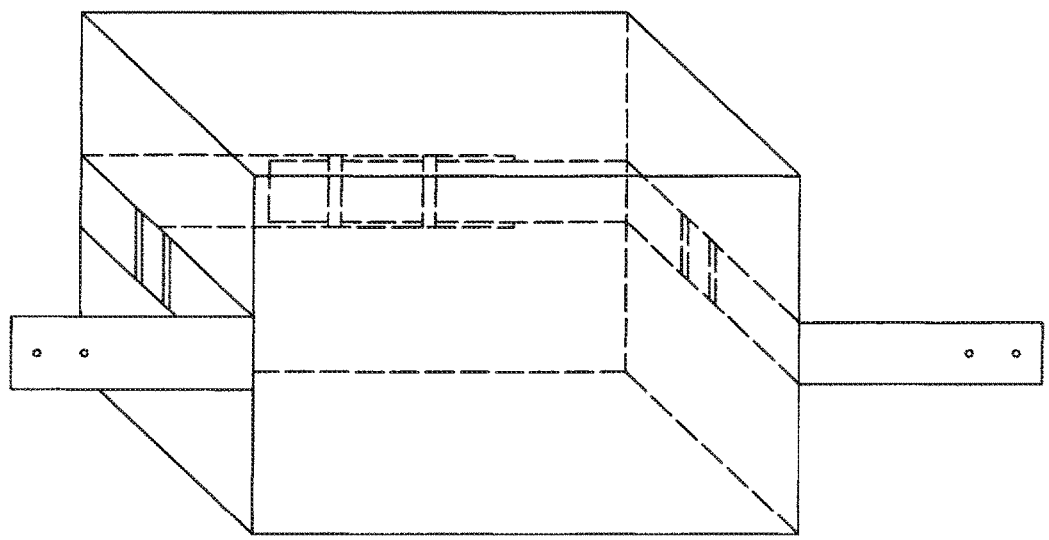
FIG. 8 is a front view of an alternative embodiment of the invention with the WUAC shown transparent for illustrative purposes.
Figure 9:
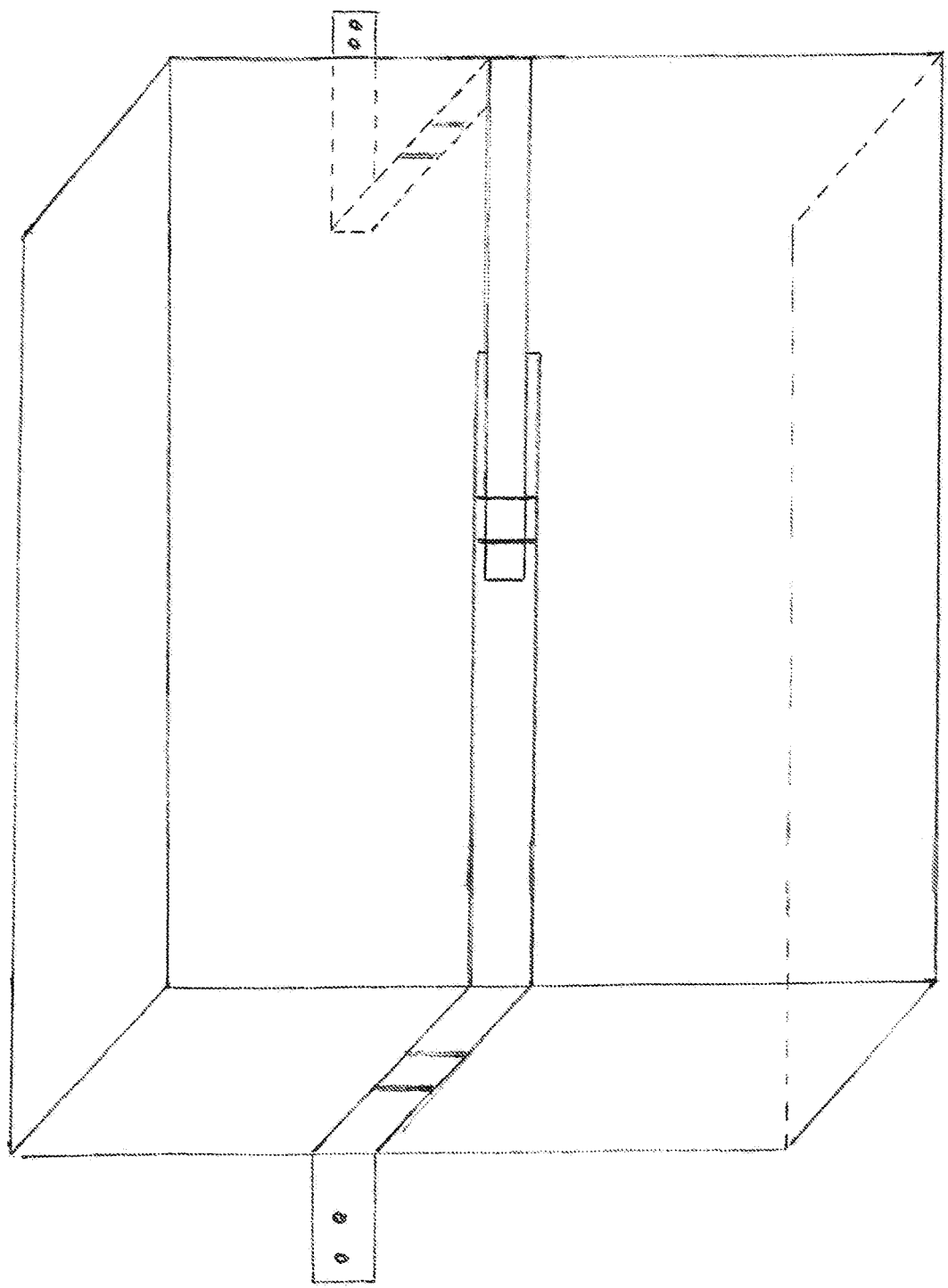
FIG. 9 is a rear view of FIG. 8.
Figure 10:
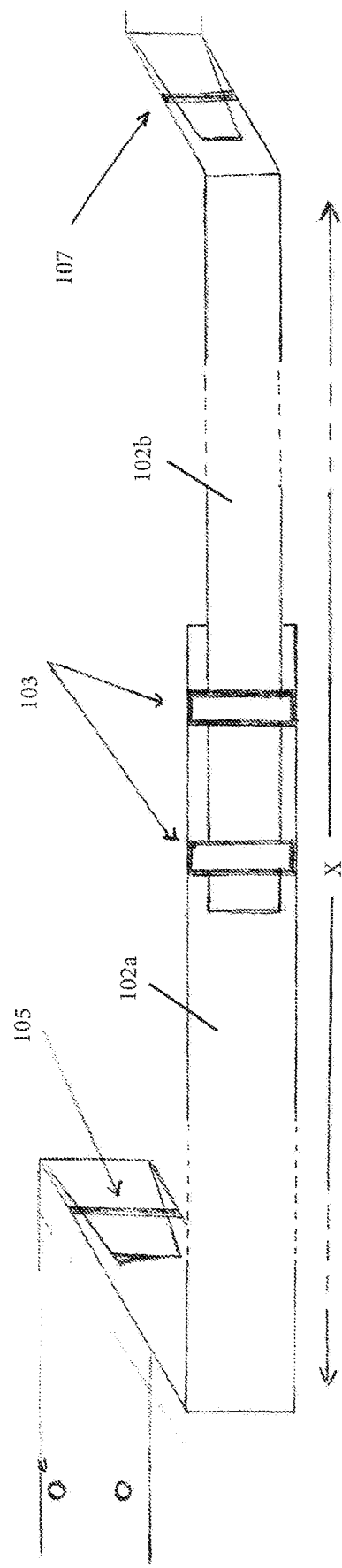
FIG. 10 is a detailed view of the installation rod.
Figure 14:
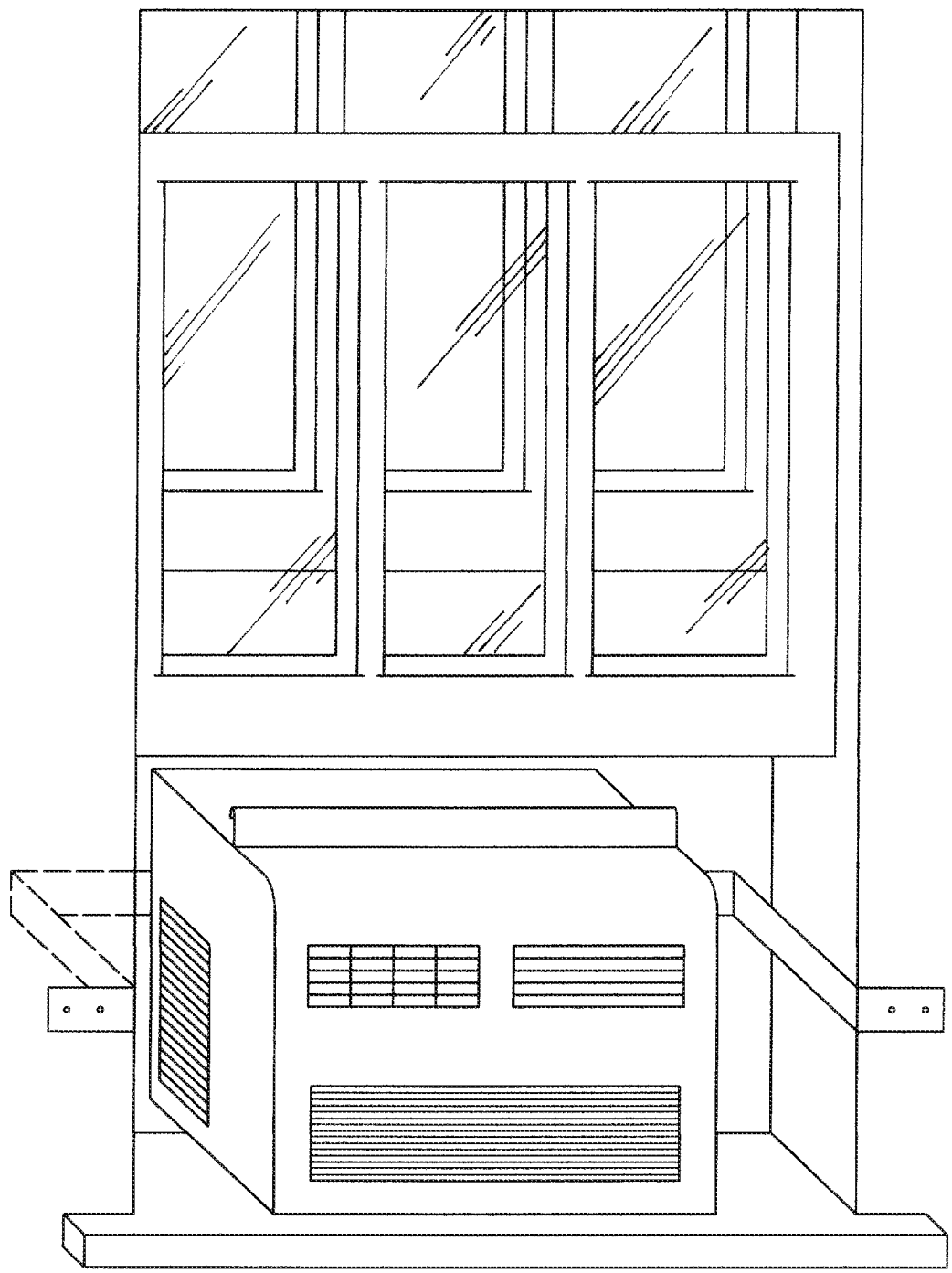
FIG. 14 is a front view of the support rod in place on the WUAC.

The apparatus 100 can be configured to engage the AC unit 10 at the rear side 22 of the AC unit 10, as shown in FIGS. 8, 9, 14, or at the spine 30 of the AC unit 10, as shown in FIGS. 6, 7, 11, 12, 17. Of course, the apparatus 100 can engage the AC unit 10 at any suitable position and location.

Turning initially to FIGS. 8, 9, 14, the apparatus 100 is shown to removably engage the rear side 22 of the AC unit 10. The rear support member 102 extends (adjustably or fixedly) behind the AC. For instance, the apparatus 100 can be pre-installed in the window, such as the connect members 108, 110 are fastened to the window frame. The AC unit 10 can then be slid into the window opening 2, where the rear side 22 engages the rear support member 102 by coming into contact with the rear support member 102 when the AC unit 10 is fully received in the window. In one embodiment, the apparatus 100 is positioned about one-third to half-way along the height of the AC unit 10, though the apparatus can be located at any suitable position along the AC unit 10. Accordingly, the rear support member 102 prevents the AC unit 10 from extending too far into the opening 2 and/or falling out of the window opening 2. The apparatus 100 need not be fastened to the AC unit 10, so that no tools are required to install and/or remove the AC unit 10 from the window opening 2.

Referring now to FIGS. 6, 7, 11, 12, 17, the apparatus 100 is shown to removably engage the spine 30 of the AC unit 10. Here, the depth of the apparatus 100 is substantially less than having the apparatus 100 extend to behind the AC unit 10, and the apparatus 100 is located much higher in the window opening 2 to align with the spine 30 at the top side 24 of the AC unit 10. As with the embodiment of FIGS. 8, 9, 14, the apparatus 100 can be pre-installed in the window, such as the connect members 108, 110 are fastened to the window frame. The AC unit 10 can then be slid into the window opening 2, where the spine 30 engages the rear support member 102 by coming into contact with the rear support member 102 when the AC unit 10 is fully received in the window. Accordingly, the rear support member 102 prevents the AC unit 10 from extending too far into the opening 2 and/or falling out of the window opening 2. The apparatus 100 need not be fastened to the AC unit 10, so that no tools are required to install and/or remove the AC unit 10 from the window opening 2. The window can close down behind the spine 30 and rear member 102, if desired by the user.

In addition, the AC unit 10 is safely and reliably retained in the window opening 2 independent of the position of the window. Accordingly, the user need not close the window in order to lock the AC unit 10 in place since the lower window sash is not needed to lock the AC unit in position. Thus, the user need not simultaneously hold the AC unit at the same time the user closes the window, as is otherwise required without use of the apparatus 100. The user can independently open and close the window without concern of the AC unit 10 falling out of the window opening 2. For instance, the user can open the window on a cool day when the AC unit 10 is not in use, without the AC unit 10 falling out of the window. That applies to both the rear-engaging and spine-engaging embodiments of the apparatus 100.

Turning to FIGS. 11(a), 11(b), yet another embodiment of the invention is shown for use with the support apparatus 100 to be configured so that a portion of the rear member 102 is positioned behind the spine 30 of the AC unit 10. Here, the rear member 102 can be fitted with one or more fastener devices 202 that extend forward from the front face of the rear member 102. The fastener devices 202 can be spring-biased to the rear support 102 to clip or clamp onto the spine 30 of the AC unit 10 and hold the device 100 in place on the AC unit 10 while the AC unit 10 is placed in and removed from the window opening. As shown, the fasteners 202 can be curved, though the fasteners 202 need not be curved. In addition, any suitable fasteners 202 can be utilized, such as nuts and bolts received in openings.

In operation, prior to installation of the AC unit 10, the fasteners 202 are coupled to the spine 30. The fasteners 202 can be an integral part of member 102, removable, such as clips, or can be more permanent such as screws or locking clips that lock to the spine 30. The fasteners 202 hold the device 100 to the AC unit 30. The user can then lift the AC unit 30 with the apparatus 10 attached, and place it in the window opening 2. The flanges 108, 110 (FIG. 6) grip the side wall or the window frame to prevent the AC unit 10 from falling out of the window during installation. Thus, no tools are required to install or remove the AC unit 10, though screws can be used to more permanently secure the flanges 108, 110 to the wall or window. The flanges 108, 110 can have an elongated slot that receives a fastener (such as a screw) to better facilitate fastening the flange to the wall. To remove the AC unit 10, the reverse process is used.

The apparatus 100 is engaged with a locking system onto the spine 30 of the AC unit by the fastener 202, to prevent it from being displaced by being pushed or pulled forward out of the window. The AC unit 10 is placed flatly on the window still or stool or the rear support member 102 is aligned in the groove of the window casing. Once safely placed on the window stool, the flanges 108, 110 come into contact against the window frame. This will allow the AC unit 10 to securely and safely remain in place. The window sash is not required to hold the window in place. Tension force through gravity will maintain the AC unit 10 in place but the window sash may be engaged for additional support. Each flange 108, 110 can be at least two inches in length or longer.

As noted above, the window sash is not required to maintain the WUAC 10 in place, however, as a crime deterrent and safety precaution for children and pets, the WUAC 10 may be fastened to the window sash and the flange may also be fastened to the window frame or casing via the pre-drilled holes, in addition to other recommended conventional security measures.

Referring to FIG. 17, in another embodiment of the invention the rear member 102 can be coupled with the spine 30. FIGS. 17(a), 17(f), 17(i), 17(j), 17(k) show an adapter 150 that is formed as a one-piece Z-shape to be utilized as a locking system to fasten the assembly 100 to the spine 30 of the AC unit 10. The Z-shape is formed by a U-shaped portion and a V-shaped portion. The U-shaped portion has a center slot so that the U-shaped portion slides over the top of the spine 30 so that the spine 30 is received in the slot. The U-shaped portion has two side walls and a center connecting member. The V-shaped portion is formed from one of the side walls and an angled upright wall to form a mating channel. FIGS. 17(b)-17(e), 17(g), 17(h), 17(i) show the rear support 102 having the top portion folded downward and the bottom portion folded upward to form a sleeve with a receiving channel. As illustrated in FIGS. 17(g), 17(h), 17(i), the angled upright wall of the adapter 150 interlocks with the folded down top portion of the rear support 102, so that the angled upright wall enters the mating channel of the folded down top portion and the folded down top portion of the rear support 102 enters the mating channel of the V-shaped portion. This serves to securely fasten the assembly 100 to the spine 30 of the AC unit 10. The AC unit 10 can then be lifted in place onto the window stool. It is noted that instead of an adapter 150, the spine 30 can be configured to integrally have an angled upright wall.

Figure 15:
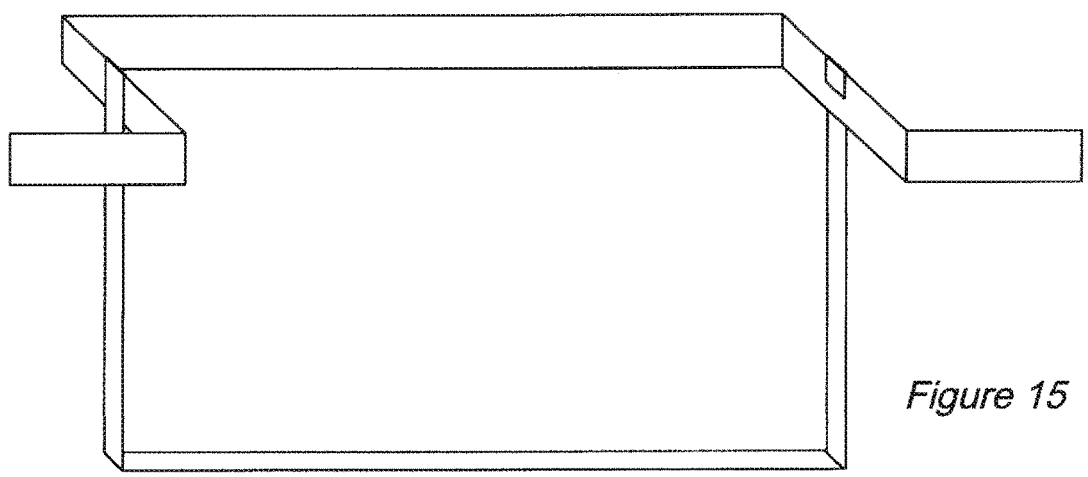
FIG. 15 shows a support rod with an optional lower support bracket.

FIGS. 2-14 show embodiments in which the support apparatus 100 (including the window frame bracket member and the side bracket members) does not extend beneath a bottom of the air conditioner and do not include any vertical brackets. Turning to FIG. 15, a support apparatus is shown the extends beneath the bottom of the air conditioner and has vertical brackets. Here, a support rod is shown which fits snuggly and horizontally around the AC. The flanges fit against the interior window frame. The support bracket is shown fastened to the support rod to give support from the bottom 26 of the AC unit 10. The support bracket can be adjustable in height and width, in the same manner as the rear support 102. The support bracket, forms a close fitting vertical U-shape that attaches to the support rod assembly. The support rod assemble can be adjustable in width in the as the installation rod 102. The support would also be in part due to tension force and gravity. The support assembly has a first and second downward bracket, and a cross-support member connected there between. The cross-member extends below the bottom 26 of the AC unit 10.

In one embodiment, the material of the assembly 100 and support bracket can be composed of rigid weight bearing, weather resistant material with proven appropriate tensile strength, such as a metal. This would further allow all three pieces to be graded by weight range capacity.

Figure 12:
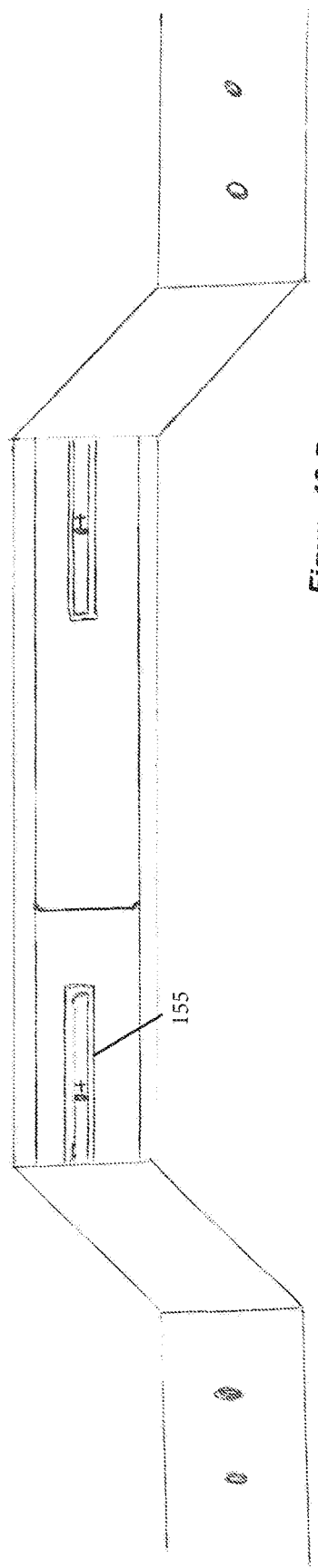
FIG. 12A is a front view of the installation rod with a security track for fastening to the spine of a WUAC.
FIG. 12B is a front view of the installation rod secured to the spine of a WUAC with security tracks.
Figure 12:
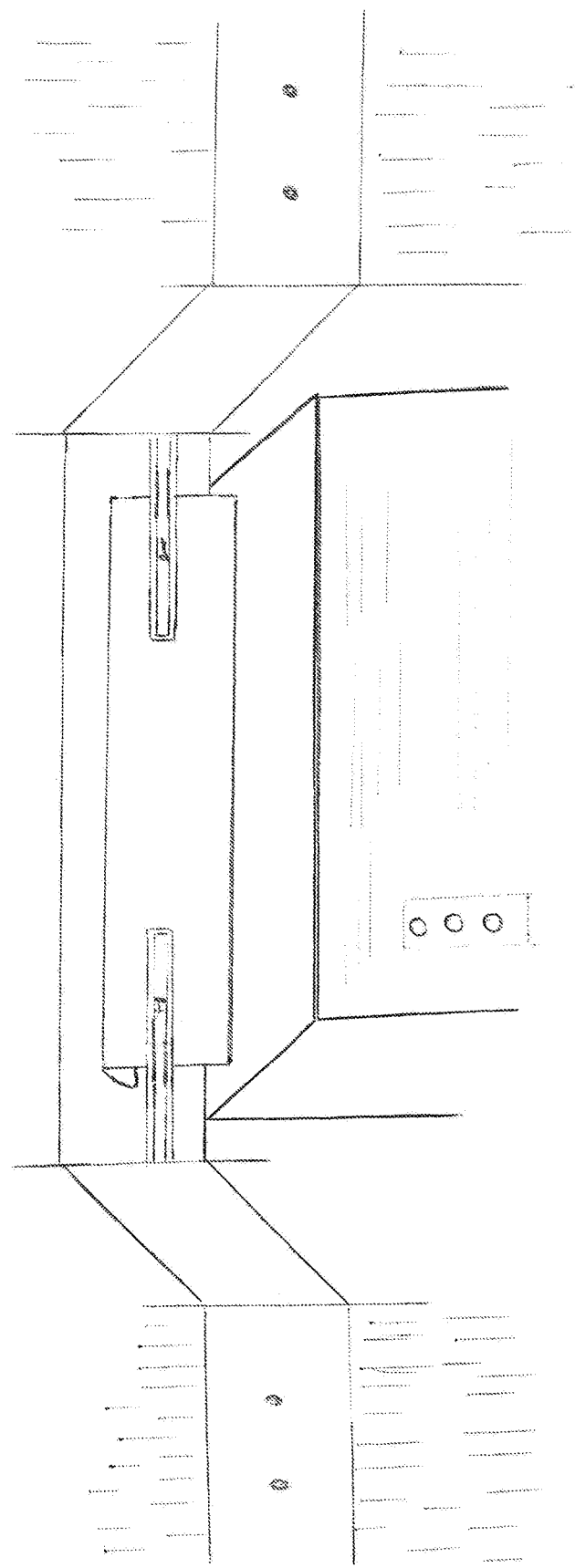
Figure 13:
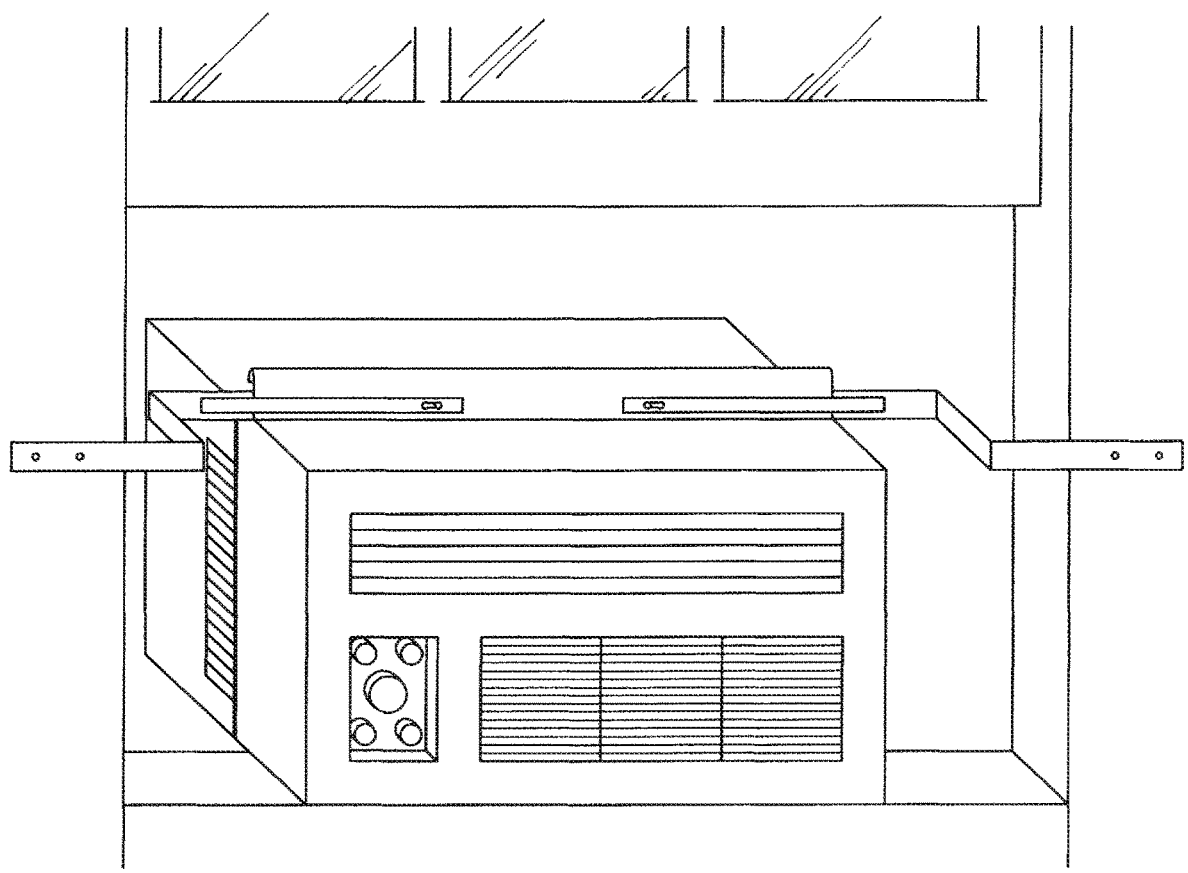
FIG. 13 is a front view of the installation rod secured to the spine of an installed WUAC.

Turning to FIG. 12, one or more clips 155 are shown for further use with the invention. The clips 155 are elongated and have a longitudinal axis that extends parallel to the longitudinal axis of the rear support 102. As shown in FIGS. 12(*b*), 13, the clips are coupled to the rear support 102 and are biased toward the rear support 102 to form a channel therebetween. The assembly 100 can be attached to the spine 30 of the AC unit 10 by sliding the clips 155 to the front side of the spine 30 at the far ends of the spine 30, while the rear support remains at the rear side of the spine 30, such that the spine 30 is received in the channel between the rear support 102 and the clip 155. The clips can telescope outward, so that the user can slide them outward to overlap with and engage the spine 30 after the rear support 102 is positioned adjacent to the spine 30.

Figure 16A:
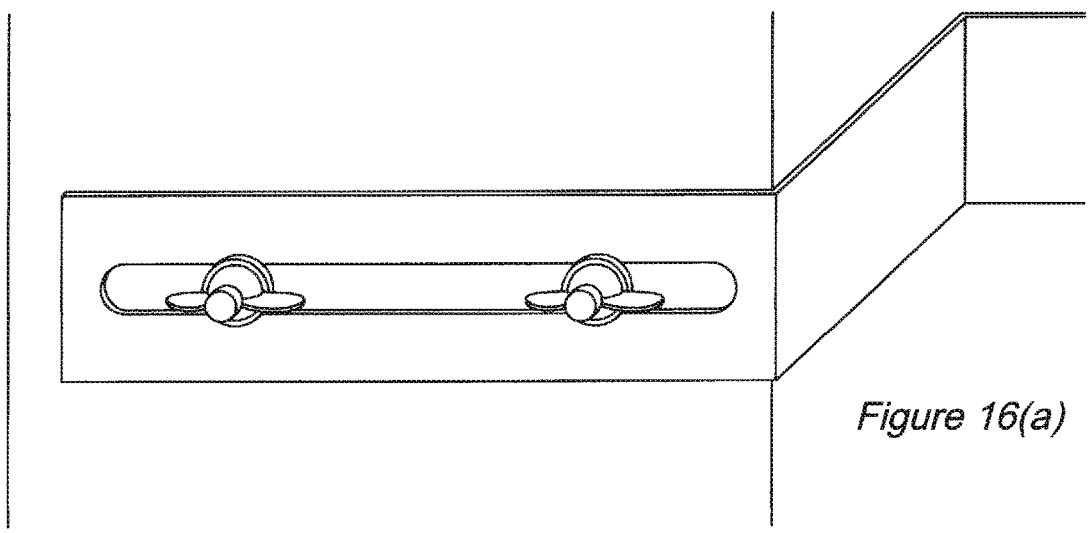
FIGS. 16(*a*), (*b*) show a locking system securing the support rod to window frame.
Figure 16B:
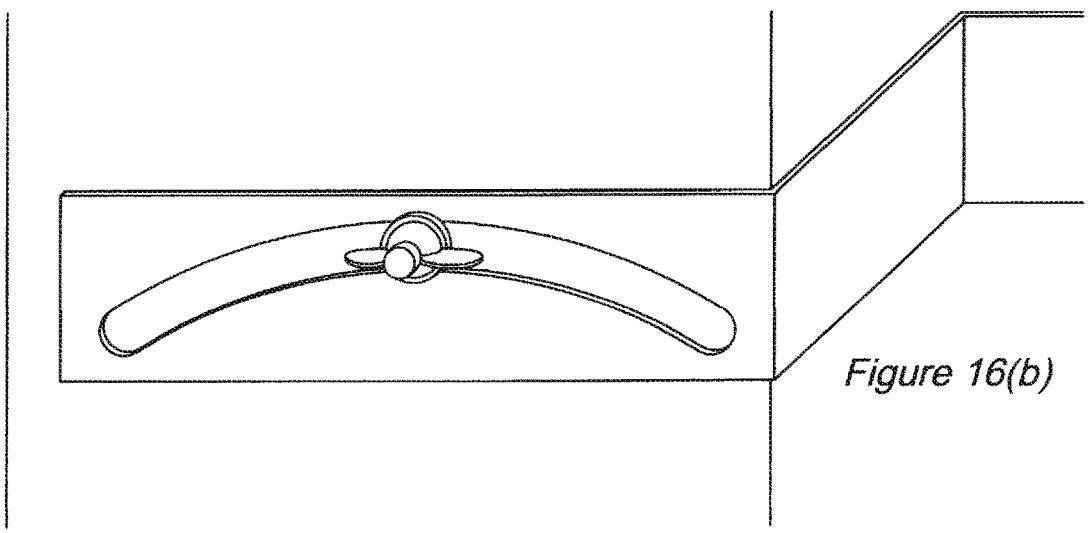
Figure 17B:
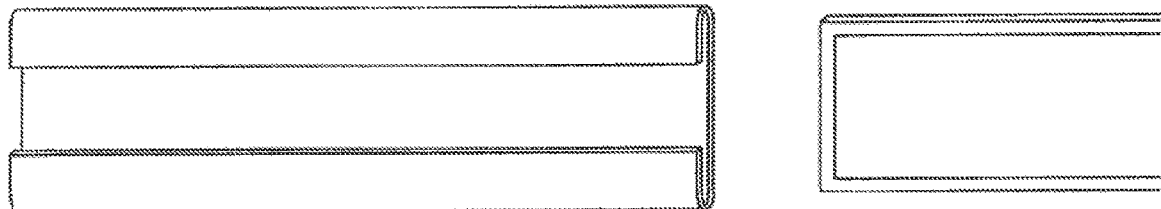
FIGS. 17(*a*)-(*k*) fastening device securing the spine to the installation rod.
Figure 17C:
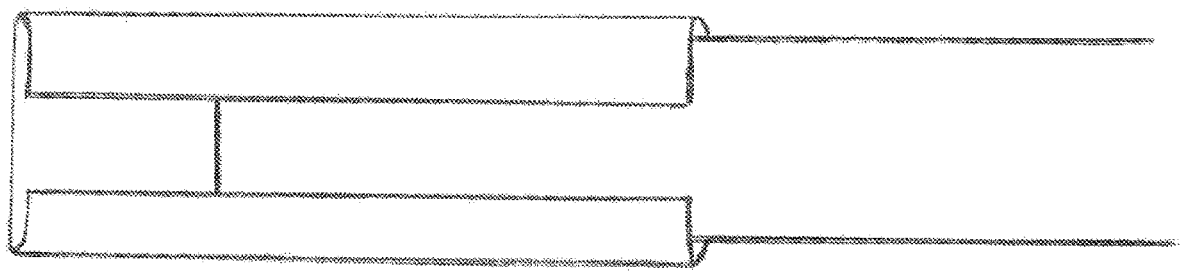
Figure 17D:
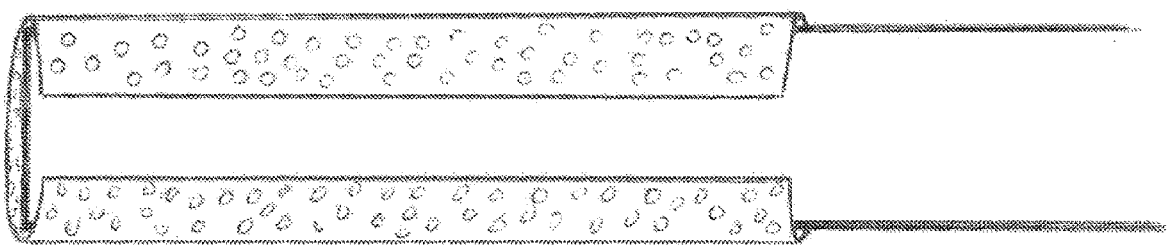
Figure 17E:
Figure 17F:
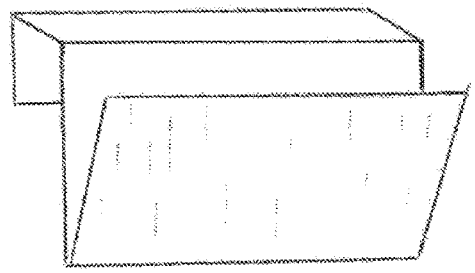
Figure 17G:
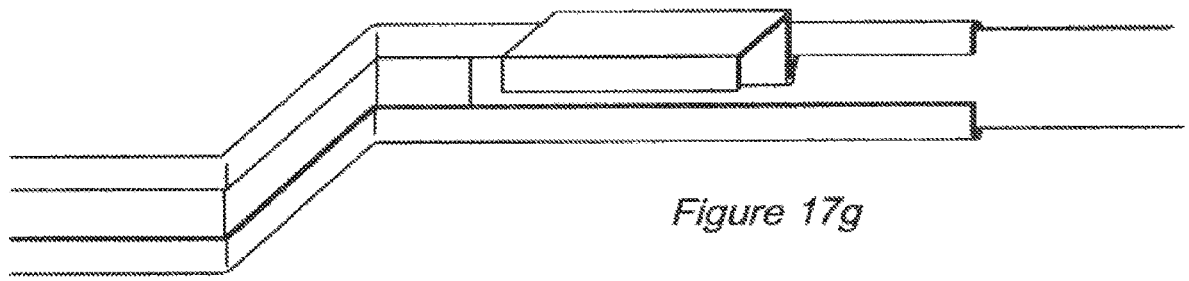
Figure 17H:
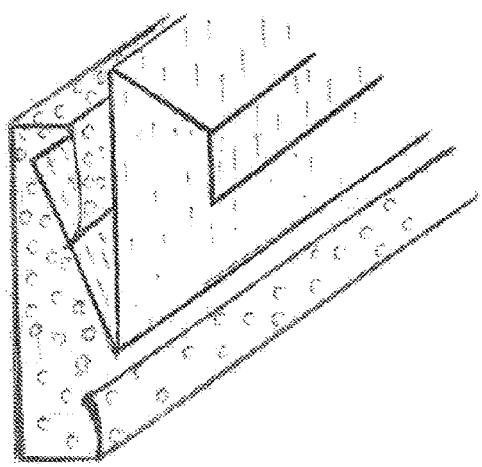
Figure 17J:
Figure 17J:
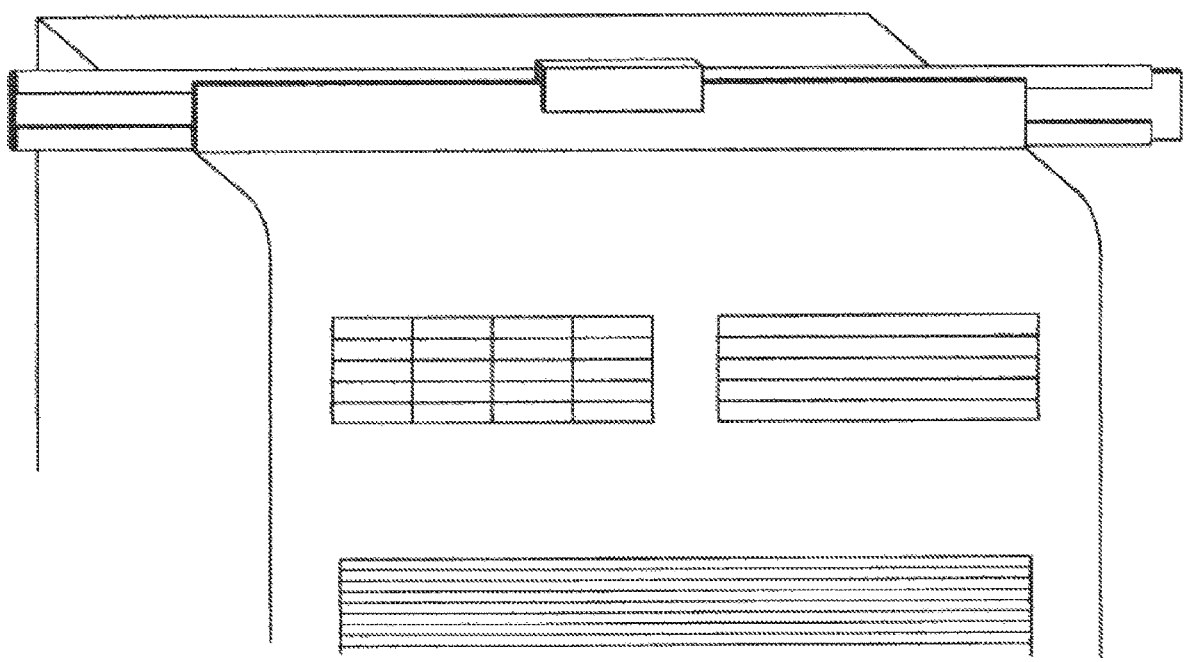
Figure 17K:
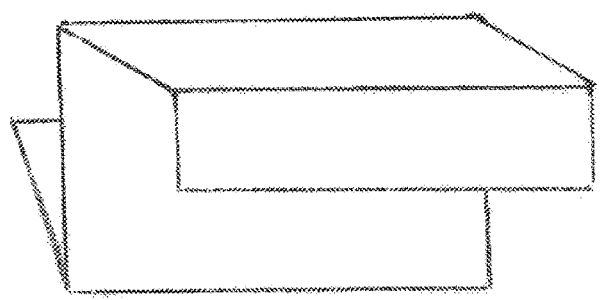

Turning to FIG. 16, another feature of the invention is shown. Here, the connect members 108, 110 can have an elongated slot that receives one or more fasteners such as screws. That facilitates connection of the connecting members 108, 110 to the window frame in an adjustable manner and allows, for example, the side members 104, 106 to be positioned against the inner surface of the window jamb.

The description given of the embodiments, the use, operation, implementation, material, design and construction of the indicated invention is not limited to what has been stated. What has been stated is simply illustrative.

An adjustable assembly 100 for installing and supporting a window unit air conditioner and allows a one-step easy installation and removal. The apparatus has two U-shaped horizontal rods and a vertical rod that utilize the window frame and the weight of the WUAC, to install, support, and keep the WUAC in place. The assembly 100 may be used alone or in combination with the support bracket depending on the weight of the WUAC. The assembly 100 fits behind and unto the spine of the WUAC and across its width. When lifted in place, the assembly 100 fits against the window frame using gravity to securely keep the WUAC in place.

The invention provides an easy one-step process for installing and removing a window unit air conditioner (WUAC) without requiring any tools or drilling. It also allows easy grip of WUAC for installation on uninstallation. Drilling or tools are optional, allowing for less technical skill requirement. The apparatus 100 is adjustable to fit multiple width windows and jambs. It allows the window sash to be opened with the WUAC remaining securely in place. It uses tension force/gravity to support WUAC in place, and relieves pressure on exterior walls to support WUAC, and avoids damage to interior and exterior walls or frames. The invention also eliminates the cumbersome nature of installing and providing support for a WUAC. Conventional brackets not required to support WUAC.

One purpose of the invention is to provide a device and an easy, one-step process of installing and supporting a window unit air conditioner (WUAC). The invention results in a non-cumbersome manner of effectively installing a safe and securely fitting unit that does not require tools. It also provides a support system that is installed from inside the building without the use of tools or a ladder as required with conventional installation. The invention allows the unit to be kept securely in place without the use of the window sash and also allows easy removal of the unit.

The description given of the embodiments, use, operation, implementation, material, design and construction of the indicated invention is not limited to what has been stated. What has been stated is simply illustrative. For example, though the assembly 100 is shown and described as having two connect members 108, 110, two side members 104, 106, and a rear support 102, plus a support rod and a support bracket: only a support rod may be necessary.

It is further noted that the description uses several geometric or relational terms and directional or positioning terms, such as linear, longitudinal, transverse, parallel, orthogonal, top, bottom, and sides. Those terms are merely for convenience to facilitate the description based on the embodiments shown in the figures. Those terms are not intended t it file invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the various sizes, shapes and dimensions are approximate and exemplary to illustrate the scope of the invention and are not limiting. The sizes and the terms "substantially" and "about" mean plus or minus 15-20%, more preferably plus or minus 10%, even more preferably plus or minus 5%, most preferably plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A support apparatus for installing and retaining a discrete window air conditioner in a window opening of a wall, the support apparatus comprising:
    a window frame bracket member having a forward-facing surface and a rearward-facing surface, said window frame bracket member configured so the rearward-facing surface contacts and engages a forward-facing surface of the wall;
    a side bracket member coupled substantially orthogonal to said window frame bracket member and configured to extend along an inner window jamb of the window opening and a side of the window air conditioner, said side bracket member defining a depth of said support apparatus and having a discrete first side bracket portion and a discrete second side bracket portion, wherein the second side bracket portion is adjustably engaged with the first side bracket portion to adjust the depth of said support apparatus; and
    a rear support bracket member coupled substantially orthogonal to said side bracket member and having a forward-facing surface and a rearward-facing surface, said rear support bracket member configured so that the forward-facing surface extends at least partly across a rear of the window air conditioner or a spine of the window air conditioner;
    wherein said support apparatus does not extend beneath a bottom of the air conditioner.

2. The support apparatus of claim 1, wherein said window frame bracket member, said side bracket member, and said rear support bracket member are each elongated strips and form a single discrete unattached contiguous piece.

3. The support apparatus of claim 2, wherein said window frame bracket member, said side bracket member, and said rear support bracket member each have co-planar top edges and co-planar bottom edges.

4. The support apparatus of claim 1, wherein said window frame bracket member, said side bracket member, and said rear support bracket member are each rigid metal or weight bearing material.

5. The support apparatus of claim 1, wherein said support apparatus has a width, and wherein said rear support bracket member comprises a discrete first rear support bracket portion and a discrete second rear support bracket portion, wherein the second rear support bracket portion is adjustably engaged with the first rear support bracket portion to adjust the width of said support apparatus.

6. The support apparatus of claim 1, further comprising the window air conditioner, said rear support bracket member coupled to said window air conditioner.

7. The support apparatus of claim 1, said support apparatus consists of said window frame bracket member, said side bracket member, and said rear support bracket member, which forma single discrete unattached contiguous piece.

8. The support apparatus of claim 1, wherein said support apparatus does not include any vertical brackets.

9. A support apparatus for retaining a window air conditioner in a window opening of a wall, the support apparatus comprising:
    a first window frame bracket member configured to engage a first surface of the wall;
    a first side bracket member coupled substantially orthogonal to said first window frame bracket member and configured to extend along a first inner window jamb of the window opening and a first side of the window air conditioner, and wherein said first side bracket member comprises a discrete first side bracket portion and a discrete second side bracket portion, wherein the second side bracket portion is adjustably engaged with the first side bracket portion to adjust a length of said first side bracket member and a depth of said support apparatus;
    a second window frame bracket member configured to contact and engage a second surface of the wall;
    a second side bracket member coupled substantially orthogonal to said second window frame bracket member and configured to extend along a second inner window jamb of the window opening and a second side of the window air conditioner, and wherein said second side bracket member comprises a discrete third side bracket portion and a discrete fourth side bracket portion, wherein the third side bracket portion is adjustably engaged with the fourth side bracket portion to adjust a length of said second side bracket member and the depth of said support apparatus; and
    a rear support bracket member coupled substantially orthogonal to said first and second side bracket members and configured to extend across an entire rear of the window air conditioner or an entire spine of the window air conditioner, whereby the first and second side bracket members and said rear support bracket member form a general U-shape;
    wherein said support apparatus does not extend beneath a bottom of the air conditioner.

10. The support apparatus of claim 6, said support apparatus consists of said first window frame bracket member, said first side bracket member, said second window frame bracket member, said second side bracket member, and said rear support bracket member, which form a single discrete unattached contiguous piece.

11. The support apparatus of claim 1, wherein said support apparatus does not include any vertical brackets.

12. A support apparatus for installing and retaining a discrete window air conditioner in a window opening of a wall, the support apparatus comprising:
    a window frame bracket member having a forward-facing surface and a rearward-facing surface, said window frame bracket member sized and aligned so that the rearward-facing surface contacts and engages a forward-facing surface window frame of the wall;
    a side bracket member coupled substantially orthogonal to said window frame bracket member and sized and aligned to extend along an inner window jamb of the window opening and a side of the window air conditioner, said side bracket member defining a depth of said support apparatus and having a discrete first side bracket portion and a discrete second side bracket portion, wherein the second side bracket portion is adjustably engaged with the first side bracket portion to adjust the depth of said support apparatus; and
    a rear support bracket member coupled substantially orthogonal to said side bracket member and having a forward-facing surface and a rearward-facing surface, said rear bracket member sized and aligned so that the forward-facing surface extends at least partly across a rear of the window air conditioner or a spine of the window air conditioner;

wherein said support apparatus does not extend beneath a bottom of the air conditioner.

13. The support apparatus of claim 12, wherein said support apparatus has a width, and wherein said rear support bracket member has a discrete first rear support bracket portion and a discrete second rear support bracket portion, wherein the second rear support bracket portion is adjustably engaged with the first rear support bracket portion to adjust the width of said support apparatus.

14. The support apparatus of claim 12, said support apparatus consists of said window frame bracket member, said side bracket member, and said rear support bracket member, which form a single discrete unattached contiguous piece.

15. The support apparatus of claim 12, wherein said support apparatus does not include any vertical brackets.

16. A method for installing and retaining a discrete window air conditioner in a window opening of a wall, the method comprising:

providing a window frame bracket member having a forward-facing surface and a rearward-facing surface, said window frame bracket member configured so that the rearward-facing surface contacts and engages a forward-facing surface window frame of the wall;

providing a side bracket member coupled substantially orthogonal to said window frame bracket member and configured to extend along an inner window jamb of the window opening and a side of the window air conditioner, the side bracket member defining a depth of the support apparatus and having a discrete first side bracket portion and a discrete second side bracket portion, wherein the second side bracket portion is adjustably engaged with the first side bracket portion to adjust the depth of the support apparatus; and providing a rear support bracket member coupled substantially orthogonal to said side bracket member and having a forward-facing surface and a rearward-facing surface, said rear bracket member configured so that the forward-facing surface extends at least partly across a rear of the window air conditioner or a spine of the window air conditioner;

wherein the window frame bracket member and the side bracket member do not extend beneath a bottom of the air conditioner.

17. The method of claim 16, wherein said window frame bracket member, said side bracket member, and said rear support bracket member are each elongated strips and form a single discrete unattached contiguous piece.

18. The method of claim 16, wherein the rear support bracket member has a discrete first rear support bracket portion and a discrete second rear support bracket portion, and further comprising adjustably engaging the second rear support bracket portion with the first rear support bracket portion to adjust a length of the rear support bracket member.

19. The method of claim 16, wherein the window frame bracket member sized and aligned so that the rearward-facing surface contacts and engages a forward-facing surface window frame of the wall, coupling the side bracket member substantially orthogonal to said window frame bracket member and configured to extend along the inner window jamb of the window opening and a side of the window air conditioner; and coupling the rear support bracket member substantially orthogonal to said side bracket member and having a forward-facing surface and a rearward-facing surface, said rear bracket member forward-facing surface configured to extend at least partly across a rear of the window air conditioner or the spine of the window air conditioner.

* * * * *

UNITED STATES PATENT AND TRADEMARK OFFICE
CERTIFICATE OF CORRECTION

PATENT NO. : 10,859,288 B1
APPLICATION NO. : 15/954714
DATED : April 17, 2018
INVENTOR(S) : Carnegie It is certified that error appears in the above-identified patent and that said Letters Patent is hereby corrected as shown below:

In the Drawings

Figure 5:
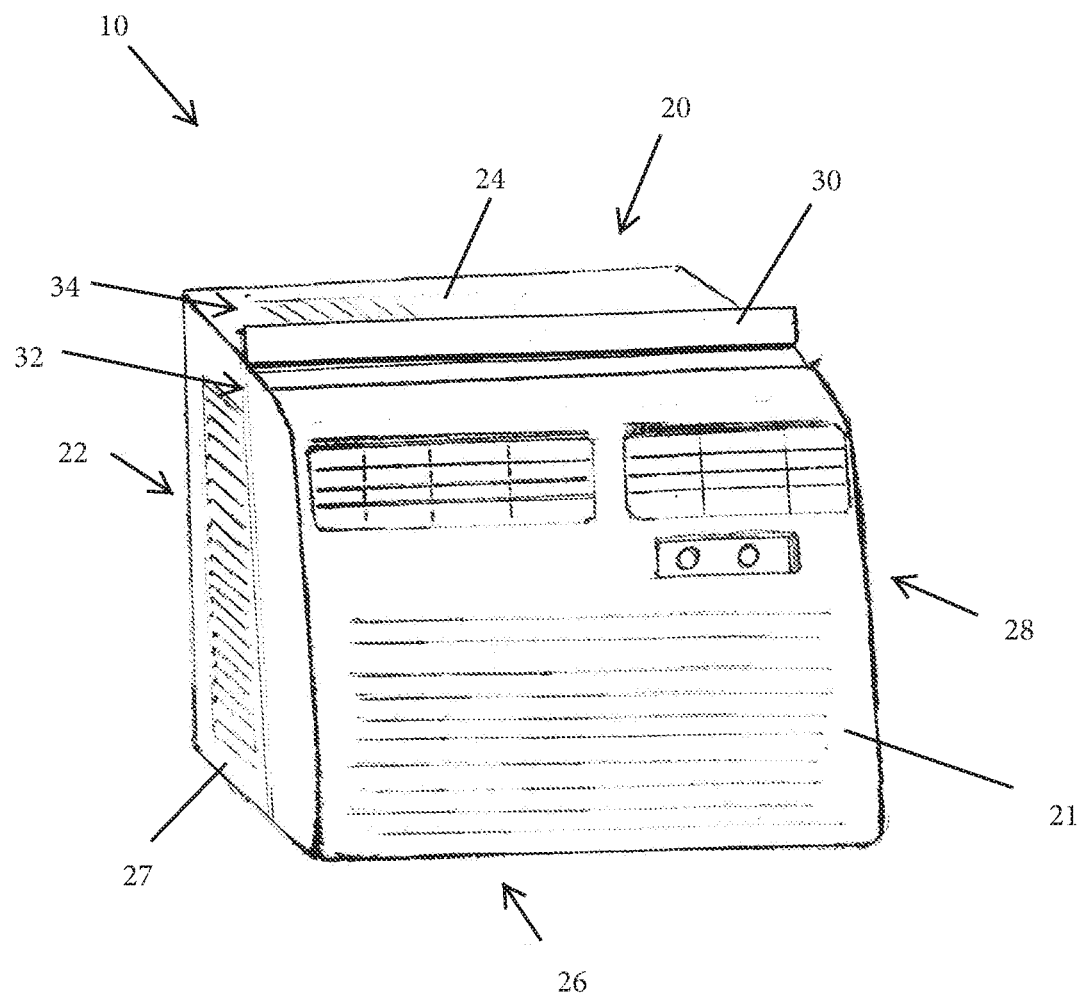
FIG. 5 is a front perspective view of a conventional PRIOR ART window unit air conditioner (WUAC) with spine.
Figure 6:
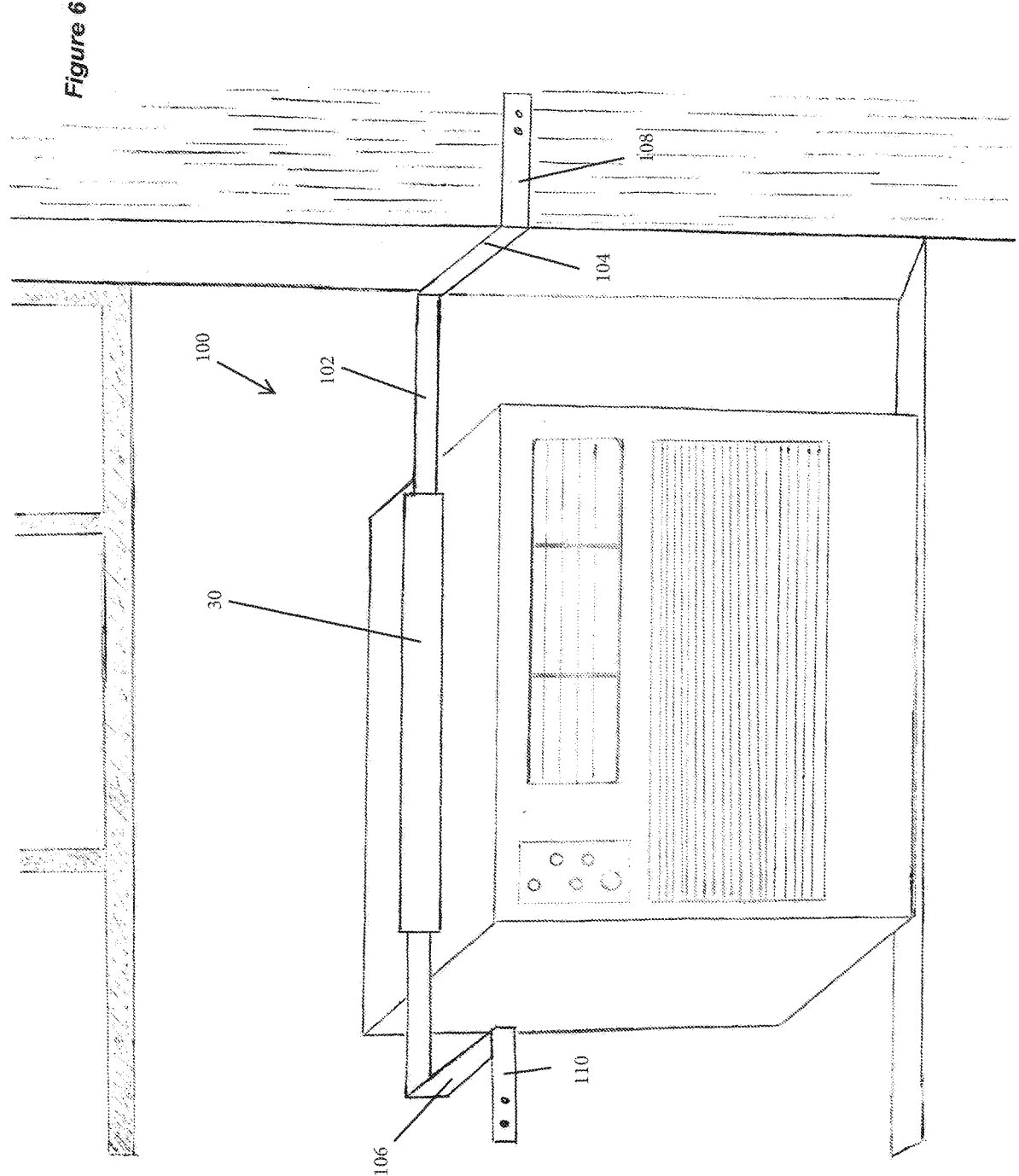
FIG. 6 is a front perspective view of the WUAC installed in a window opening utilizing the installation rod of the present invention.
Figure 7:
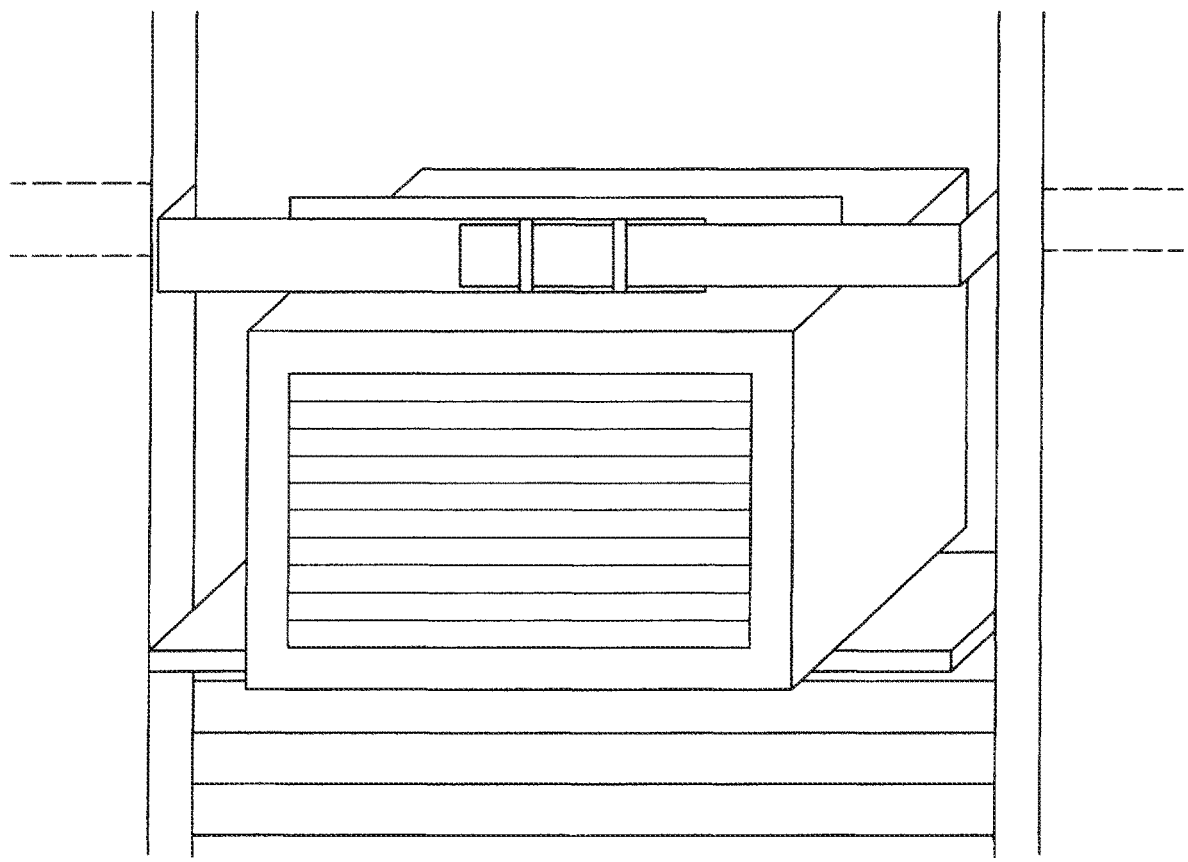

Replace Sheet 5 of 18, insert -- Figure 5 – PRIOR ART -- as shown on the attached sheet.

Signed and Sealed this
Twenty-fourth Day of May, 2022

Katherine Kelly Vidal
*Director of the United States Patent and Trademark Office*

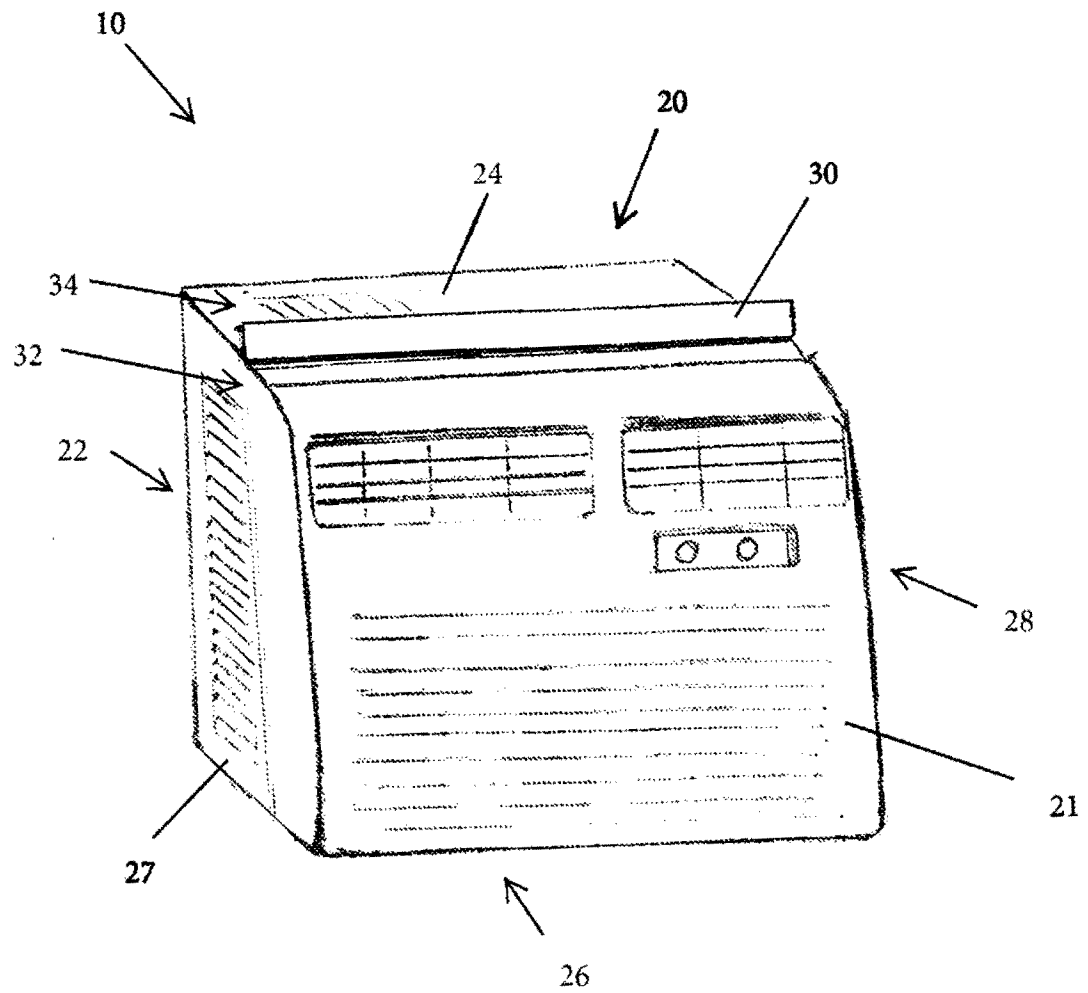
FIGURE 5 - PRIOR ART